Figure 1:
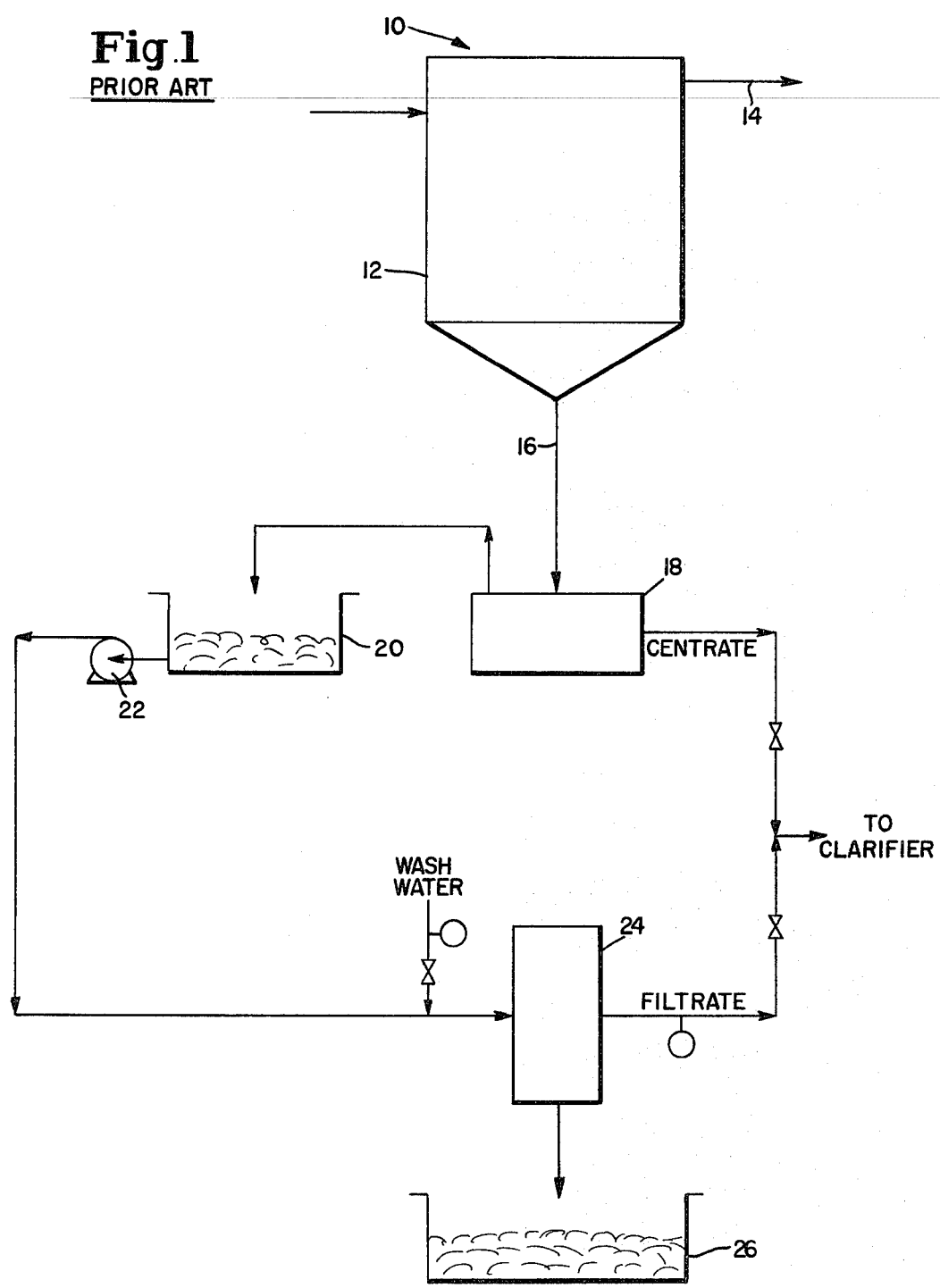

United States Patent [19]

Duffey

[11] 4,318,788

[45] Mar. 9, 1982

[54] CHROMATE RECOVERY PROCESS

[75] Inventor: Joseph G. Duffey, Williamsville, N.Y.

[73] Assignee: ANDCO Environmental Processes, Inc., Buffalo, N.Y.

[21] Appl. No.: 102,937

[22] Filed: Dec. 12, 1979

[51] Int. Cl.³ .................... C02F 1/46; C01G 37/02
[52] U.S. Cl. .................................. 204/149; 423/53; 423/61; 423/596
[58] Field of Search ............... 204/149, 151, 152, 89; 423/596, 53, 61

[56] References Cited

U.S. PATENT DOCUMENTS

| | | | |
|---|---|---|---|
| 802,205 | 10/1905 | Gibbs | 204/89 |
| 3,926,754 | 12/1975 | Lee | 204/152 |
| 4,004,994 | 1/1977 | Andrus | 204/152 |
| 4,014,766 | 3/1977 | Watanabe et al. | 204/89 |
| 4,036,726 | 7/1977 | Gale et al. | 204/149 |
| 4,123,339 | 10/1978 | Gale et al. | 204/149 |
| 4,171,248 | 10/1979 | Carlin | 423/596 |
| 4,188,272 | 2/1980 | Moring | 204/149 |

OTHER PUBLICATIONS

"Inorganic Chemistry", Ephraim, 4th ed., rev. 1943, p. 473.

Primary Examiner—Andrew Metz
Assistant Examiner—Donald R. Valentine
Attorney, Agent, or Firm—LeBlanc, Nolan, Shur & Nies

[57] ABSTRACT

A process for recovering and recycling chromium from chromium-iron hydroxide sludge for use in cooling tower make up water and plating solution is disclosed. The process comprises separating chromium from the sludge by selectively oxidizing the trivalent chromium precipitate to soluble hexavalent chromium with a strong oxidizing agent such as chlorine gas, in alkaline medium. The hexavalent chromium ions then enter solution and are thereafter separated from the iron hydroxide precipitate as the sludge is dewatered.

7 Claims, 2 Drawing Figures

CHROMATE RECOVERY PROCESS

This invention relates to a process for recycling chromium recovered from a toxic sludge which results from the removal of contaminating ions from waste water such as cooling tower water or chromium plating solutions.

Waste liquid or aqueous media containing toxic materials such as hexavalent chromium ions has presented an acute disposal problem. However, in accordance with the inventions described and claimed in U.S. Pat. Nos. 3,926,754 4,036,726 and 4,123,339, assigned to the assignee of this invention, hexavalent chromium ions from cooling tower waste water may be rapidly and efficiently removed electrochemically. Accordingly, the disclosures of these patents are hereby incorporated by reference.

In the above patents, a process and apparatus were described wherein waste water containing hexavalent chromium ions is caused to flow between a plurality of electrodes. It was discovered that when the anode has a surface or a portion of the surface of iron, an iron alloy or an insoluble iron compound, an iron compound such as iron hydroxide will be produced anodically. In turn, an insoluble trivalent chromium compound, preferably as the hydroxide, will be produced which will complex with or otherwise physically or chemically combine with the insoluble iron compound to thereby permit removal from solution. Whereas it was previously considered necessary to reduce hexavalent chromium to trivalent chromium in acidic solution, it was discovered that the iron compound or complex formed will reduce hexavalent chromium and co-precipitate therewith in solution having a pH from about 4 to about 11. Accordingly, the invention described and claimed in said patents produces an insoluble iron-chromium precipitate without pH adjustment to thereby rapidly and efficiently remove toxic hexavalent chromium from solution. The precipitate is then removed from the aqueous media utilizing conventional techniques such as a clarifier, settling pond or the like and the aqueous media thereby clarified is suitable for disposal.

In this process, hexavalent chromium undergoes cathodic reduction to form trivalent chromium as insoluble chromic hydroxide which complexes with iron which enters solution at the anode. These products are not susceptible to further electrolytic oxidation at the anode, back to hexavalent chromium, apparently due to the difference in ionization potential, at least in part because the production of the hydroxide ion at the anode occurs at a much lower potential than other electrode-oxidations. Thus, because of the non-amphoteric state of the iron complex, the reaction continues until the undesirable contaminating ions are completely or substantially completely removed from solution in the aqueous media.

Normally, the initial contaminant concentration in water treated will be no less than about 0.03 parts per million, and in most instances from 1 to 5,000 parts per million. After treatment in the electrolytic cell as described above, the water containing solids or flocculent normally flows into a clarifier wherein the solids settle and collect at the bottom thereof. The overflow to discharge is water containing less than 0.05 parts per million chromium, suitable for disposal. The underflow from the clarifier then is normally dewatered by centrifugation, and the solids from the centrifuge, filtered. Both the centrate and filtrate are then returned to the clarifier. The solids from the filter, iron-chromium hydroxide at a concentration of about 50% solids, are disposed of according to acceptable toxic sludge disposal techniques.

However, in the case of cooling tower water, fresh cooling tower make-up water must be added to the tower continually, and this make-up water requires the addition of fresh hexavalent chromium salts. Accordingly, under prior techniques, the apparatus of the above described patents is utilized to produce a sludge containing trivalent chromium for disposal while new hexavalent chromium salts are continually added to fresh make-up water. Similarly, in the case of plating solutions fresh make-up water must be provided with chromium salts therein while spent solutions are purified for disposal.

In accordance with this invention, it has been discovered then that trivalent chromium may be rapidly and efficiently separated from the sludge and oxidized to hexavalent chromium for recycling in fresh make-up water for cooling towers and plating solutions. In addition, it has been discovered that according to the process of this invention, trivalent chromium precipitate may be oxidized to hexavalent chromium ions for recycling rapidly and economically by utilizing a strong oxidizing agent in alkaline media whereby the chromium is virtually completely removed from the sludge to detoxify the sludge so that conventional disposal techniques may be utilized therewith.

Accordingly, it is an object of this invention to provide a process for reclaiming and recycling chromium from toxic sludge.

It is another object to provide a process for reclaiming and recycling hexavalent chromium for reuse in cooling tower and plating solution make-up water.

It is another object to provide a process for treating a chromium-iron hydroxide sludge to selectively oxidizing chromium to soluble hexavalent chromium and separate the soluble ions from the sludge.

It is yet another object to provide a process and apparatus for treating by-product sludge from a water purification process whereby hexavalent chromium is reduced and precipitated as a hydroxide compound or complex with iron, and the precipitate subsequently subjected to an oxidizing agent for selective oxidation of the insoluble chromic hydroxide to soluble hexavalent chromium whereby chromium may be separated from the sludge for recycling or reuse.

Figure 2:
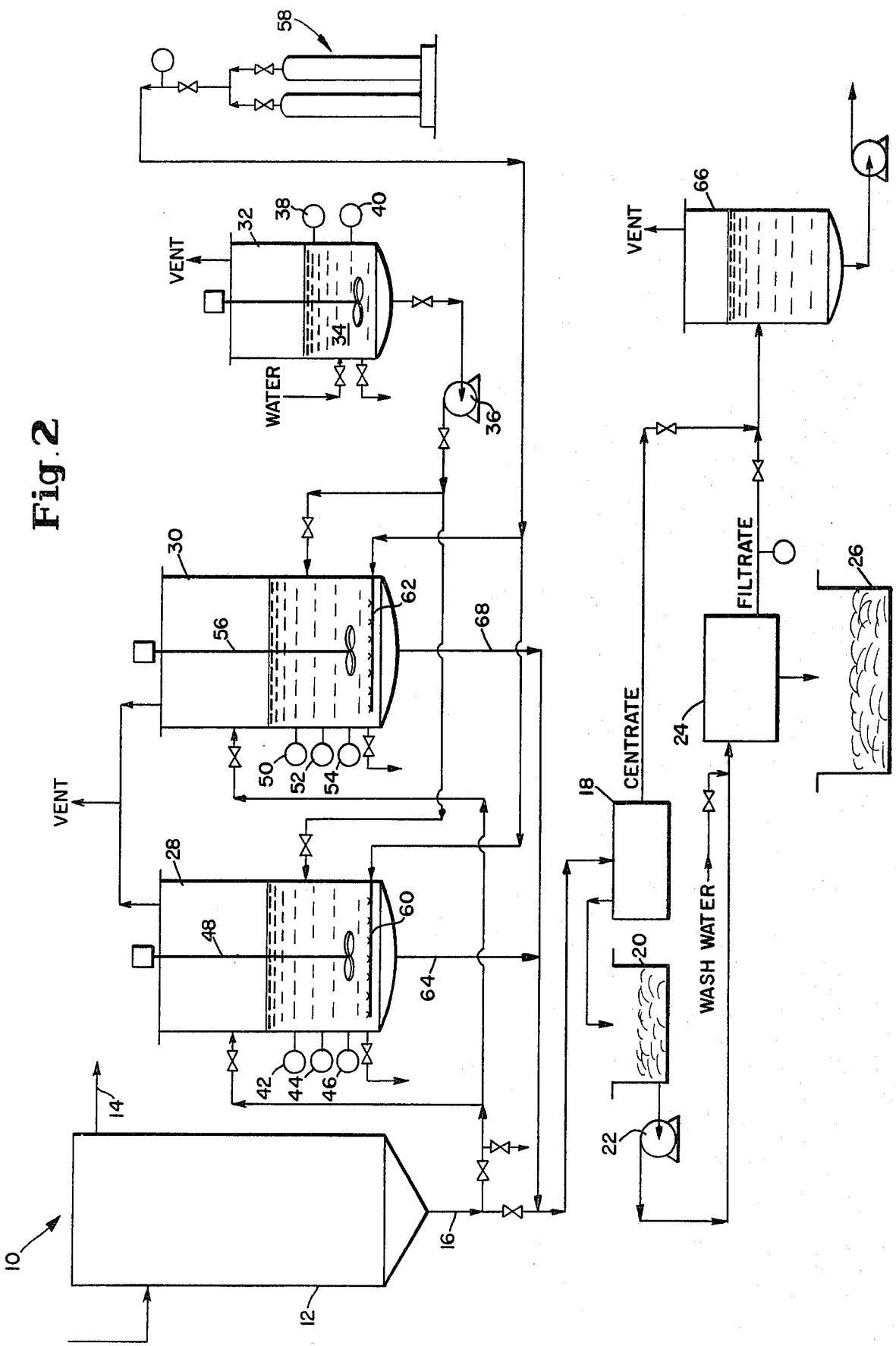

These and other objects will become apparent with reference to the drawings and following descriptions wherein:

FIG. 1 is a schematic representation of the conventional sludge separation and dewatering process and apparatus; and FIG. 2 is a schematic representation of an apparatus for carrying out the process of this invention.

In the patented process for electrochemical contaminant removal as described in U.S. Pat. No. 3,926,754, cooling tower blow down water or plating solutions containing toxic hexavalent chromium are passed through a cell having an anode of iron or an iron containing material such as steel. Preferably, a plurality of electrodes are provided as described in U.S. Pat. Nos. 4,036,726, and 4,123,339 and the electrodes are steel.

As the aqueous solution passes by and between the plurality of electrodes, erosion occurs and iron enters solution, forms an hydroxide, and reduces or reacts with the hexavalent chromium to form chromic hydroxide. The ferric-chromic hydroxide is formed as a precipitate or flocculant, and as noted above the reaction proceeds to completion without reoxidation of the trivalent chromium to hexavalent chromium primarily because of the non-amphoteric state of the iron complex formed with the chromic hydroxide.

With attention to FIG. 1, typically in the prior art water from the electrochemical unit must be clarified to separate the solids therefrom for disposal. Water containing chromic and ferric hydroxide solids is initially transferred to a clarifier 10. The solids collect at the bottom 12 of clarifier 10, and the overflow water containing only acceptable maximum concentrations of hexavalent chromium, such as a concentration of less than 0.05 parts per million, is suitable for disposal. The overflow water then proceeds to conventional disposal (not shown) through overflow pipe 14, and the underflow is dewatered for disposal.

The underflow from the clarifier 10 typically at a concentration of about 1% solids flows through line 16 to centrifuge 18. Solids are concentrated in the centrifuge 18 typically to a concentration of about 15% solids and are then transferred to a holding tank 20. Subsequently, the concentrated solids are pumped through a sludge pump 22 to filter 24.

In filter 24, the solids are dewatered to a concentration of about 50% solids, and then transferred to a sludge receiver 26 for disposal as a toxic waste. The sludge as noted above consists of ferric and chromic hydroxides. The filtrate from filter 24 and the centrate from centrifuge 18 are then returned to the clarifier 10 for recycling.

The ferric hydroxide and chromic hydroxide sludge resulting from the contaminate removal process above described has a concentration of 3 parts ferric hydroxide to one part chromic hydroxide, by weight. The process is capable of removing 24 pounds per day of hexavalent chromium from a flow of, for example, cooling tower blow down water of 200 gallons per minute having a concentration of about 10 parts per million hexavalent chromium. The treated water after clarification then will have an accepted chromium concentration, as noted above, for disposal. The recovery process of the instant invention then is intended to be capable of treating the solids separated by the electrochemical process above described, or in fact, any chromium containing sludge. The instant process utilizes preferably the strong oxidizing agent, chlorine gas to selectively cause the chromium constituent to enter solution for separation. In cold, dilute alkaline solution chlorine gas will react as follows to form hypochlorite ion:

$$Cl_2 + 2OH^- \rightarrow OCl^- + Cl^- + H_2O$$

The hypochlorite ion then reacts in turn with trivalent chromium as follows:

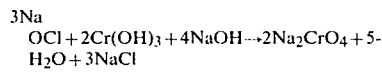
$$3NaOCl + 2Cr(OH)_3 + 4NaOH \rightarrow 2Na_2CrO_4 + 5H_2O + 3NaCl$$

The overall reaction then for the oxidation of trivalent chromium to hexavalent chromium is as follows:

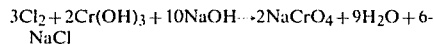
$$3Cl_2 + 2Cr(OH)_3 + 10NaOH \rightarrow 2Na_2CrO_4 + 9H_2O + 6NaCl$$

It has been discovered that the presence of ferric hydroxide precipitate does not substantially interfere with the above reaction, and therefore, the reaction proceeds very rapidly, producing a bright yellow color solution as the hexavalent chromium ion is formed.

Preferably the reaction is maintained at a pH of about 8 or between 8 and 10, and at room temperature. At elevated temperatures, hypochlorite ions will disproportionate and form chlorate ion.

While the chlorate ion is also a good oxidizing agent, excess may desirably have to be removed before the water is reused. Hypochlorite will readily disassociate at room temperature to chlorine and oxygen, and preferably, the excess will be removed merely by storage with agitation.

The process of the instant invention may be implimented with an apparatus as shown in FIG. 2 as will be subsequently described. As will be obvious to those skilled in the art, however, the instant invention is not intended to be limited to the apparatus shown, and the following description is merely illustrative of the process of this invention.

As noted above, the underflow in line 16 from clarifier 10 normally contains solids in the concentration of about 1%. The solids are chromic hydroxide and ferric hydroxide. In order to treat the solids, a first reactor tank 28 is provided, and preferably a second reactor tank 30 is also provided. As will be obvious to those skilled in the art, the number of reactor tanks provided is a matter of choice. The underflow from line 16 then is initially directed into the first reactor tank 28. Typically, the flow into reactor tank 28 will proceed at a rate of about 2 gallons per minute until the tank is about half full, and contains around 200-250 gallons. At this point the flow will be diverted to reactor tank 30 and the flow will begin collecting in reactor tank 30 while the contents of tank 28 are treated as follows.

In order to raise the pH of the solution in tank 28 to at least 8, a caustic solution is added.

Typically, a tank 32 containing a 25-35% sodium hydroxide solution 34 will be utilized as a source of caustic. Caustic will be added from tank 32 to reactor tank 28 through a caustic pump 36. The temperature and liquid level in tank 32 will be continuously monitored by conventional temperature and liquid level indicators 38 and 40 and the pH, temperature, and liquid level of reactor tank 28 will similarily be monitored by indicators 42, 44 and 46. Tank 28 preferably contains a mixer 48 to ensure a continuous mixing of the solution therein. Likewise, reactor tank 30 will be provided with pH, temperature, and liquid level indicators of conventional design, 50, 52 and 54. In addition, a mixer 56 will also be provided within reactor tank 30. The caustic tank 32 then will be selectively in communication with the interior of reactor tank 28, or reactor tank 30.

Utilizing a 2 gallon per minute flow rate from clarifier 10 and a volume of approximately 200-250 gallons to be treated according to the process of this invention, the two tanks 28 and 30 may be utilized so that the contents of one tank will be undergoing oxidation while the underflow from the clarifier flows into the alternate tank. Typically, the caustic will be added over about 15 minute period and approximately 7.7 pounds of a 32% sodium hydroxide solution will be added.

As noted above, the preferred oxidizing agent is the strong oxidizing agent chlorine gas. Chlorine gas is provided in tanks 58. After addition of the caustic to raise the pH to about 8, chlorine gas is bubbled through, preferably, a sparger pipe 60 in tank 28. A similar pipe 62 is provided in tank 30 for alternate operation of the process of this invention treating the contents of that tank. About 4 pounds of chlorine are bubbled through the sparger pipe at the bottom of reactor tank 28 to treat from 200–250 gallons of the solids contained in the liquid underflow from the clarifier 10. As soon as chlorine is admitted, oxidation will begin and the trivalent chromium will be immediately converted to yellow hexavalent chromium. Tests have indicated that the reaction proceeds to completion in about one half hour.

Upon completion of the reaction, the contents of reactor 28 are drained through line 64 to a conventional centrifuge 18. The centrate from the centrifuge 18 then is collected in a product tank 66. Solids from the centrifuge 18 are then transferred to a conventional filter 24. The filtrate from filter 24 is also transferred to product tank 66.

Once the material has passed through filter 24, wash water is added thereto to wash the filter cake. The sludge from the filter 24 is then deposited in a sludge receiver 26 for disposal. The sludge will consist of only ferric hydroxide with a very neglible amount of chromic hydroxide or hexavalent chromium therein. Accordingly, conventional disposal techniques may be utilized with the sludge from the receiver 26. The wash water from filter 24 will also be conveyed to the product tank 66. As will be obvious to those skilled in the art, the presence in the system of chlorine gas will require certain safety measures. Accordingly, both reactor tanks 28 and 30 and product tank 66 are vented to a chlorine analyzer (not shown) to eliminate inadvertent release of chlorine into the atmosphere.

When reactor tank 28 is empty, the underflow from clarifier 10 previously routed to reactor tank 30 will be diverted to reactor tank 28. Reactor tank 30 will then be similarly treated with caustic from the caustic tank 32 through pump 36. When the pH has been established at the preferred level, chlorine from tanks 58 will be bubbled through the contents of tank 30 through sparger pipe 62. The contents of tank 30 will then be diverted through line 68 to centrifuge 18 for separation of the liquid therein. After treatment, in the centrifuge 18, the solids will be filtered in filter 24, and ultimately, conveyed to sludge receiver 26. The liquid separated in centrifuge 18 and filter 24 including the wash water, will then be conveyed to the product tank 66 as described above with relation to the contents of reactor tank 28.

In this fashion, the solids from the clarifier may be continuously treated at alternate tanks 28 and 30 to selectively oxidize trivalent chromium to hexavalent chromium. If desired, the hexavalent chromium collected in product tank 66 may be acidified or otherwise treated, and is available for reuse in cooling tower make up water or plating solutions, as desired.

The above described process is described for the treatment of water containing about 10 parts per million hexavalent chromium initially to separate the chromium therefrom and subsequently recover hexavalent chromium for reuse in make-up water. The water is initially treated, preferably, according to the process described in the above identified patents and clarified to separate a chromic-ferric hydroxide precipitate. The underflow from the clarifier then will contain about 1% solids in the form of 3:1 iron to chromium hydroxide. The underflow at a rate of slightly less than 2 gallons per minute is then treated as described above according to the instant recovery process to continuously separate the chromium from the insoluble ferric hydroxide whereby the chromium is oxidized to hexavalent chromium for reuse in for example cooling tower or plating solution make-up water.

The reaction described above relative to the use of chlorine as a oxidizing agent has been found to proceed very rapidly whereby at least 200 gallons of the material to be treated may be subjected to oxidation with four pounds of chlorine in less than one half hour. It will be obvious to those skilled in the art that it is not intended to limit this process to a particular flow rate, or to the quantities of materials treated. The above description is intended to be illustrative only of a preferred embodiment of this invention.

The above process as described may be characterized as a batch or batch-continuous process. However, this invention is not intended to exclude continuous operation. For example, chlorine gas and caustic could be continuously supplied to line 16 to oxidize trivalent chromium in the line thereby by-passing the need for reaction tanks.

While the apparatus shown in FIG. 2 and described herein includes both centrifuge 18 and filter 24, as will be obvious to those skilled in the art, it is technically possible to achieve the desired results with a filter only. Furthermore, in certain centrifuges it is possible to collect sludge and wash the sludge therein. Accordingly, this invention contemplates dewatering with any desired apparatus including a centrifuge and/or a filter, but not limited thereto.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a process for recovering contaminating hexavalent chromium ions electrochemically removed from an aqueous medium by forming an insoluble iron compound or complex therewith which process comprises passing an electric current through the aqueous medium containing the contaminating ions between an anode which has a surface or a portion of a surface thereof of iron, iron alloy, or insoluble iron compound, and a cathode so as to produce anodically an insoluble iron compound, species, or complex in said medium while cathodically reacting said contaminant ions with the medium to generate an insoluble hydroxide thereof whereby an insoluble iron compound or complex with the contaminate ion hydroxyide is produced, and whereby substantially chromium free aqueous medium may be separated therefrom, the improvement comprising:

concentrating the insoluble iron-chromium hydroxide compound or complex in said aqueous medium;

adjusting the alkalinity of said concentrate to a pH of at least about 8;

selectively oxidizing the chromium constituent of said compound or complex to soluble, hexavalent chromium ions;

separating said soluble hexavalent chromium ions from said insoluble iron compound whereby said hexavalent chromium ions are available for reuse; and diluting said soluble hexavalent chromium ions with water to form an aqueous medium for recycling thereof.

2. The process of claim 1 wherein the insoluble iron-chromium hydroxide compound or complex comprises ferric hydroxide and chromic hydroxide.

3. The process of claim 2 wherein said hydroxides are present in a ratio of about 3:1 ferric hydroxide to chromic hydroxide, by weight.

4. The process of claim 1 wherein the pH of said concentrate is maintained at between about 8 and 10.

5. The process of claim 1 wherein the step of concentration said compound or complex comprises admitting the aqueous medium to a clarifier; removing substantially chromium free aqueous medium from the upper portion thereof; and removing a mixture of said compound or complex in aqueous medium from the bottom portion thereof having a solids concentration of at least about 1% by weight.

6. The process of claim 1 wherein the step of selectively oxidizing the chromium constituent of said compound or complex comprises bubbling chlorine gas through said concentrate to oxidize said constituent to soluble hexavalent chromium.

7. The process of claim 6 wherein the step of separating said soluble hexavalent chromium ions from the insoluble iron compound comprises passing said oxidized concentrate through a centrifuge, collecting the centrate, passing separated solids through a filter, and collecting filtrate, said centrate and filtrate containing the hexavalent chromium ions in solution.

* * * * *